United States Patent [19]

Williams

[11] 4,051,961
[45] Oct. 4, 1977

[54] AUTOMATIC TRASH PICKUP MACHINE

[75] Inventor: James P. Williams, Plainview, Tex.

[73] Assignee: Williams Automatic Refuse Removal Corporation, Albuquerque, N. Mex.

[21] Appl. No.: 589,638

[22] Filed: June 23, 1975

[51] Int. Cl.$^2$ ............................................. B60P 1/36
[52] U.S. Cl. ................................ 214/83.14; 198/301
[58] Field of Search ............... 214/83.14, 519–522; 198/7 BL, 7 R, 8, 9, 167

[56] References Cited

U.S. PATENT DOCUMENTS

| | | | |
|---|---|---|---|
| 1,536,444 | 5/1925 | Martin | 198/9 X |
| 2,835,098 | 5/1958 | Scheidenhlem | 198/8 |
| 3,587,814 | 6/1971 | Garabedian et al. | 198/7 BL |
| 3,734,318 | 5/1973 | Kraus | 214/83.14 |
| 3,923,169 | 12/1975 | Van Drie | 198/167 |

Primary Examiner—Trygve M. Blix
Assistant Examiner—Jesus D. Sotelo
Attorney, Agent, or Firm—Jones, Tullar & Cooper

[57] ABSTRACT

An automatic trash pickup assembly which may be attached to a forward portion of a vehicle such as a trash truck for use in picking up and conveying to a rear portion of the truck, trash, refuse, and the like, which may be packed in any disposable container. An inclined elevating conveyor assembly is attached to the vehicle at one point through a ball and socket assembly and to the front of the vehicle by a sliding bar and sleeve. A fully floating reel is carried above the forward end of the conveyor and is structured to move up or down in response to the size of the trash encountered. A revolving underroller, having extending and retracting cleats, is affixed to the forward end of the conveyor and counterrotates with the floating reel. The conveyor assembly is laterally movable from a position extending directly in front of the vehicle to a position wherein the conveyor swings outboard of the vehicle to remove trash from the sidewalk or curb adjacent the roadway. The attachment of the conveyor assembly to the vehicle allows such sideways movement without subjecting the inclined conveyor assembly to twist or tilt. Further, apparatus is provided for automatically changing the elevation of the forward end of the conveyor in response to changes in height of the surface from which the trash is to be removed.

30 Claims, 9 Drawing Figures

AUTOMATIC TRASH PICKUP MACHINE

FIELD OF THE INVENTION

The present invention is directed generally to a trash pickup assembly for use with a vehicle. More particularly, the present invention is directed to a conveyor assembly attached to a forward portion of a vehicle and having means for engaging and conveying trash from the ground to a storage portion of the vehicle. Most specifically, the present invention is directed to a trash pickup assembly wherein a rotating, free floating reel and a counter-rotating underroller are positioned at the forward end of the upwardly inclined conveyor and further wherein the conveyor assembly is mounted on the vehicle in a manner which allows the assembly to swing outwardly to the side of the vehicle and to move up and down automatically in response to variations in height of the surface from which the trash is being removed.

The present invention is of the general type in which an upwardly extending conveyor assembly is attached to a forward portion of a conventional trash truck. As the vehicle moves ahead, disposable bags or boxes of trash or any similar waste or litter, are picked up at the front of the conveyor and are carried upwardly and rearwardly to be deposited in the hopper of the vehicle for compaction and temporary storage. While this general method of trash pickup is known, the present invention is directed to, as will be set forth in more detail hereinafter, improvements to the generally known concept; such improvements acting to transform the known concept to a working, practical apparatus. These improvements include, but are not limited to, a free floating reel mounted at the front of, and above the conveyor, a corresponding underroller at the forward portion of the conveyor, means for mounting the conveyor assembly on the trash truck in a manner which allows movement of the conveyor to the side of the truck while maintaining the conveyor flat without subjecting it to twisting or other similar distortions, and means for adjusting the height of the front of the conveyor automatically in response to changes of the surface on which the material to be picked up is placed.

DESCRIPTION OF THE PRIOR ART

As alluded to above, trash and article pickup machines of the same general type as the present invention are known. For example, U.S. Pat. Nos. 3,734,318 to Kraus and 3,587,814 to Garabedian et al disclose generally similar devices. In the Garabedian patent there is shown an article pickup machine wherein an upwardly extending conveyor is attached to the forward portion of a vehicle. An article lifting device and a ground engaging, article pickup mechanism are provided at the forward portion of the conveyor.

In the Kraus patent, there is shown a garbage collection vehicle wherein a conveyor means is mounted on a cantilever arm. A cross wheel is carried at the outer end of the conveyor means and serves to push containers of garbage or trash onto the conveyor which then carries the trash or garbage to a bin at the rear of the truck.

While these two patents are illustrative of the general type of assembly to which the present invention is directed, they and similar prior art devices have a number of shortcomings which have prevented the adaptation of this general concept to satisfactory usage in collecting municipal and residential trash.

For the trash to be picked up and disposed of in an automatic operation of this type, it is obvious that the trash container must itself also be disposable. Recently, this has meant the use of disposable plastic or similar material bags in which the trash is placed. Also various paper bags and sacks, cardboard boxes and the like and any other disposable container have been used for trash. As will be quickly recognized, this wide variety of various sized and shaped containers has created problems in the structuring of trash pickup assemblies. For the trash to be carried up the inclined conveyor, it must first be placed on the lower, forward end of the conveyor. Merely pushing the end of the conveyor into the trash is unsatisfactory because the trash will either be pushed ahead of the conveyor, will go under it, or the container, usually a plastic or paper bag, will break. Accordingly, a first problem is one of providing suitable means for engaging various sized disposable containers of trash and carrying them to the conveyor without breakage.

A second problem is one of mounting the conveyor assembly to the vehicle particularly when the conveyor is to be swung from a position extending directly ahead of the vehicle to a position extending out to the side, as would be required when picking up trash from the curb or sidewalk. Such movement must be accomplishable in a manner which does not put undue strain on the conveyor assembly, nor cause it to twist or deform. The conveyor mounting must also be able to automatically compensate for relative vertical movement of one portion of the assembly with another when the vehicle or conveyor encounters bumps and the like in the roadway or other trash support surface.

The U.S. Pat. No. to Kraus 3,734,318 recognizes the existance of the first problem, i.e. that of moving the trash to the conveyor, and attempts to solve it by utilizing a cross wheel placed at and above the forward end of the conveyor. This cross wheel is rotated and engages the containers of trash. The cross wheel is movable up and down to accommodate differing sizes of containers with the movement being accomplished by hydraulic cylinders controlled by the vehicle's driver. This solution is unreliable since it depends on the skill of the driver to adjust the height of the cross wheel above the conveyor. Too small an opening is apt to burst the bag, spilling the trash, too big an opening renders the apparatus ineffective. This patent also does not provide a means for mounting the assembly on the truck in a manner to allow relative vertical movement of each.

The prior U.S. Pat. No. to Garabedian et al 3,587,814 is directed to an apparaus for use in picking up packages of dried grapes from between rows in a vineyard. In this device an article lifting device is attached at the forward end, and above the upwardly extending conveyor. Since, in this device, all of the packages are generally of the same size, there is no requirement that the lifting device vary greatly in its location with regard to the conveyor. Accordingly, the lifting device, which corresponds generally to the cross wheel of the prior discussed patent and to the free floating reel of the subject invention, is attached to the conveyor and is provided with springs which allow only limited movement. Additionally, while in this device there is provided means for allowing relative vertical movement between the pickup assembly and the vehicle, no provision is made for swinging from its position extending straight ahead of the vehicle.

Accordingly, it may be seen that although the general concept of the subject invention is known, there remains the need to provide an assembly wherein the operation is fully automatic, is able to accept various sized objects, is capable of movement of the conveyor outboard of the vehicle, and allows for relative vertical movement between the pickup and conveyor assembly and the supporting vehicle automatically.

SUMMARY OF THE INVENTION

It is, accordingly, an object of the present invention to provide a trash pickup assembly having a fully floating front reel.

A further object of the present invention is to provide a trash pickup assembly having an underroller which is structured to elevate containers of trash into engagement with the free floating reel and conveyor without breaking the container.

Yet another object of the present invention is to provide a means for mounting a pickup assembly to a supporting vehicle in a manner which allows relative automatic vertical movement therebetween.

A still further object of the present invention is to provide a means for mounting the pickup assembly to the vehicle so to allow swinging of the conveyor outboard of the vehicle without twisting of the conveyor.

As discussed previously, the general configuration of the subject invention is known. However, as also previously indicated, the configuration has either been used to pick up objects other than trash in various sized disposable containers, or has required operator attention when being used to pick up varying sizes of containers.

In the present invention, a fully floating reel is placed at the front of, and above the trash conveyor. This reel has a plurality of cleats or flaps which engage the containers of trash and urge them onto the conveyor. The reel is attached to the conveyor frame in a manner, as will be discussed more fully hereinafter, which allows it to raise and lower in response to the size of trash container. While in the prior art patent discussed above, this movement was accomplished by hydraulic means controlled by an operator, in the present invention the control is directly in response to the size of the package and does not require any actuation by the driver of the truck. Thus, there is little possibility for human error and the fully floating reel closely engages the package of trash without causing it to rupture under the exertion of pressure.

A cooperating underroller is secured to the forward portion of the conveyor. This underroller counterrotates with the free floating reel and has extending and retracting resilient cleats which lift the containers of trash up so that the free floating reel can push them rearwardly onto the upwardly extending conveyor. The underroller is structured so as not to snag the flexible film which is often used as the trash container, again preventing the rupturing of the container and spillage of its contents.

This combination of fully floating reel and counterrotating underroller serve to provide an assembly wherein containers of trash, which may be easily ruptured or broken spilling their contents, are picked up from the street or curb and are urged onto the upward extending conveyor which deposits them in the truck's hopper. The reel automatically adjusts to varying sizes of containers and requires no control from the operator.

Since the bags of trash are often placed on the curb instead of in the road, the present invention is also directed to a means for mounting the conveyor to allow it to swing to the side. A hollow tube or sleeve is attached to the vehicle's bumper and a second, interior bar supports the conveyor. The interior bar is slidable with respect to the outer tube and is carried therewithin. As will be more fully discussed, this mounting allows the conveyor to swing outwardly from the truck without being subject to a twisting force which would not only cause excessive wear on the conveyor itself but would also prevent the underroller from being parallel with the ground, thereby hampering its ability to pick up containers of trash.

The conveyor assembly is also mounted on the truck through a ball and socket assembly. This mount allows the conveyor and vehicle to move vertically relative to each other as is necessary when the assembly is being used on other than flat surfaces. In addition, the conveyor's forward portion automatically raises and lowers in response to changes in surface terrain so that, for example, the forward end of the conveyor can traverse either a hump or valley with the vehicle moving across a valley or hump without damaging the conveyor. In this way the assembly can be used in unpaved or rural areas as effectively as in urban areas since rough or uneven ground will not damage the conveyor.

Thus, while the general configuration of the present invention, i.e. that of a conveyor assembly extending upwardly rearwardly from the front portion of a vehicle is known, the present invention provides a device wherein the engagement of the containers of trash is completely automatic and further wherein the mounting of the conveyor on the vehicle is superior in terms of maneuverability and freedom from wear. The fully floating reel and its cooperating underroller result in the breakage of very few bags of trash and the mounting means insure that the pickup assembly will operate satisfactorily in varying conditions of terrain and can be moved laterally to the side of the truck without twisting or warping.

BRIEF DESCRIPTION OF THE DRAWINGS

While the novel features of the invention are set forth with particularity in the appended claims, a full and complete understanding of the invention will be had from the following detailed description of a preferred embodiment and as seen in the accompanying drawings in which:

DESCRIPTION OF A PREFERRED EMBODIMENT

Figure 1:
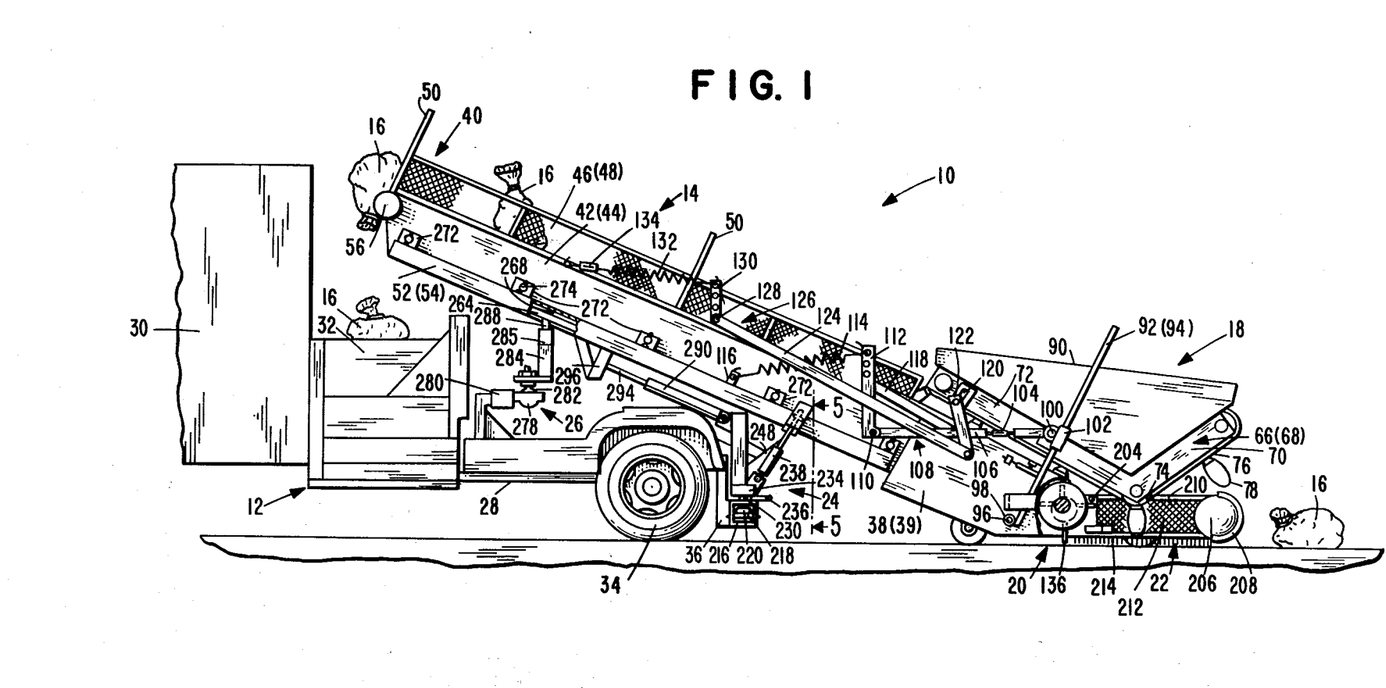
FIG. 1 is a side elevation view of a preferred embodiment of the automatic trash pickup assembly of the present invention with portions removed for clarity.

Turning now to FIG. 1 there may be seen at 10 a preferred embodiment of an automatic trash pickup apparatus in accordance with the present invention. To facilitate the understanding of the operation of machine 10, its various component parts will initially be identified and their operation and cooperation discussed generally. A more complete description of each component will then be set forth followed by a more detailed operational discussion of the apparatus as a whole.

Automatic trash pickup assembly 10 is carried generally on a supporting and transporting means such as a truck 12 and is mounted generally on the front portion of truck 12. An inclined elevator conveyor assembly 14 portion of trash pickup apparatus 10 serves to carry bags of trash 16 from the ground to the truck 12. A fully free floating reel assembly, generally at 18, is carried at a forward end of elevator conveyor assembly 14. Fully free floating reel assembly 18 coacts with a counterrotating underroller assembly, generally at 20, with reel 18 and underroller 20 combining to elevate a bag of trash 16 from the ground and urge it onto elevator conveyor 14 for movement to a storage portion of truck 12. A guide wing assembly, generally at 22, is secured to the extreme forward end of the apparatus to guide bags of trash 16 toward the reel assembly 18 and the underroller 20.

Automatic trash pickup assembly 10 is mounted on truck 12 through a front elevator and turning bolster assembly, generally at 24 which is, as may be seen in FIG. 1, located generally at the front of truck 12. A ball and socket assembly 26 supports the rear portion of elevator conveyor 14, again as may be seen in FIG. 1. As will be discussed in more detail, the trash pickup assembly 10 is mounted to truck 12 generally in a manner which allows for independant vertical movement of the assembly and truck and also allows the pickup assembly to be swung to the side of the truck.

In operation generally, the pickup assembly 10 is positioned so that the guide wing assembly 22 and the underroller 20 are just above the surface from which the bags of trash 16 are to be removed. As the truck 12 moves ahead, the trash 16 is guided by the guide wings 22 into engagement with the underroller 20 which initially contacts the trash. Coaction of the underroller 20 and the free floating reel 18 lifts the trash and carries it onto the elevating conveyor 14 for transfer to the truck 12. As will be discussed in more detail, floating reel 18 is free to move generally vertically to accomodate varying sizes of containers of trash thereby preventing breakage or rupture of the trash containers. While the trash pickup apparatus will hereinafter be described as picking up bags of trash 16 which are preferably disposable plastic bags of a known type, the apparatus will also pick up other types of trash or litter such as cardboard boxes, baled newspapers and magazines and can also pick up such diverse litter as single bottles, concrete blocks and numerous other types of trash and the like.

The trash pickup assembly 10 is mounted on the truck 12 and is provided with suitable controls, as will be discussed, so that the underroller 20 and guide wing assembly 22 are continually maintained just above the surface from which the trash is to be removed and automatically compensate for changes in surface height. The front elevating and turning bolster assembly 24 also allows apparatus 10 to be moved to the side of truck 12 without twisting or warping the elevating conveyor 14.

Referring again to FIG. 1, truck 12, which is shown somewhat schematically, includes a frame, generally at 28. A trash storage area or depository 30 is carried on frame 28 generally at the rear of the truck and bags of trash 16 fall into a compressing or compacting means 32 which forces them into depository 30. These aspects of truck 12 are conventional and well known and need no further discussion. Conventional front wheels 34 are provided on truck 12 and a front bumper 36 is secured to frame 28 ahead of the front wheels 34. The front elevating and turning bolster assembly 24 is, as may be seen in FIG. 1, secured to front bumper 36 of truck 12. Ball and socket assembly 26 is also carried by the truck 12. It is to be understood that truck 12 could either be a special vehicle constructed specifically to carry the pickup assembly 10 or could alternatively be a conventional trash hauling vehicle modified to work with pickup assembly 10. In either case, truck 12 will be understood to have a means of propulsion and suitable conventional means for driving the various hydraulic pumps and motor normally associated with such a trash compacting and transporting vehicle and further to drive the various conveyors and hydraulic systems associated with the trash pickup assembly 10.

As is shown in FIG. 1, the preferred mounting location of the trash pickup assembly 10 is at the front, right portion of truck 12. However, this preferred position could be varied if specific applications so dictated. For instance, the pickup assembly could be attached to the side of the truck and outboard thereof, if desired, so long as the mounting means 24 and 26 were utilized. Truck 12 will be seen to provide only a support and transport function and could be changed in any number of ways and hence is, itself, not a portion of the present invention.

Returning again to FIG. 1, elevating conveyor assembly 14 may be seen as being positioned generally at the front of truck 12, as has been previously discussed. Elevating conveyor 14 is a generally elongated assembly extending from forward end plates 38 (39) upwardly and rearwardly to a rear end 40 which is disposed generally above the trash compacting portion 32 of truck 12 so that bags of trash 16 carried up elevating conveyor 14 will fall from its rear portion 40 into the compactor 32.

Figures 2, 6A, 6B:
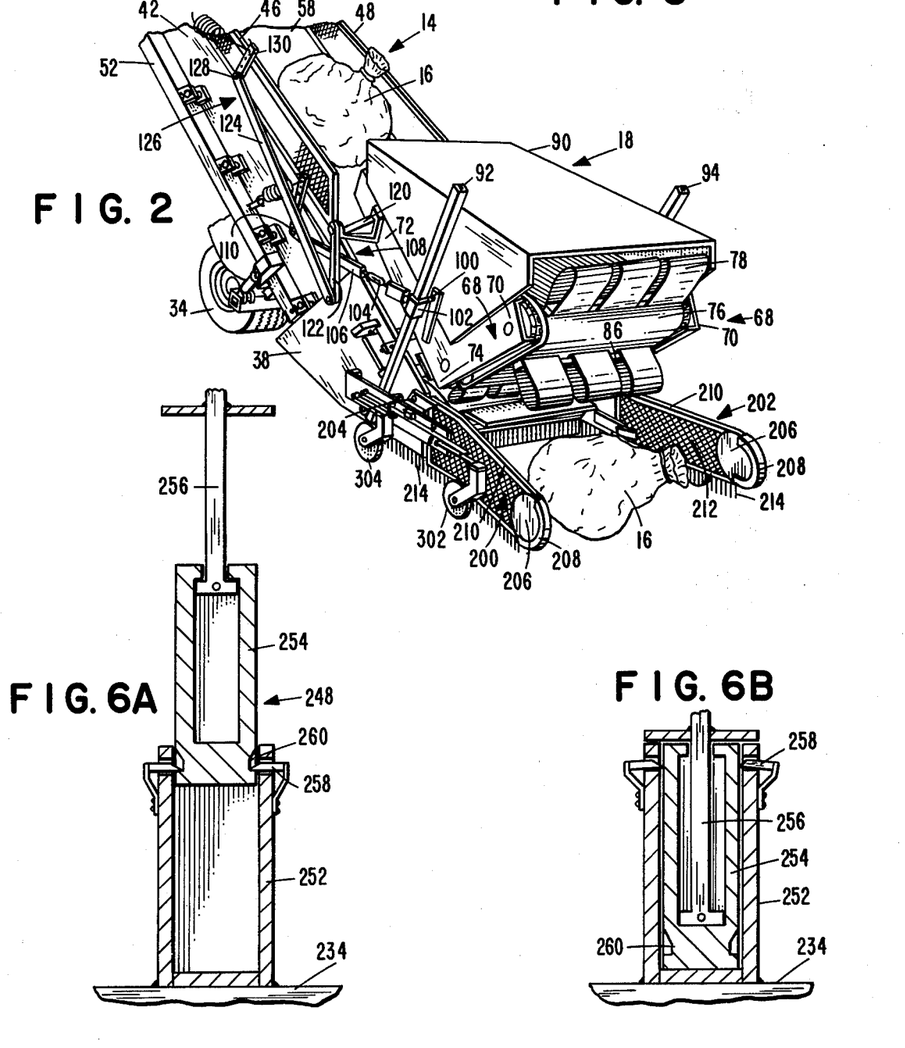
FIG. 2 is a front perspective view of a forward portion of the trash pickup machine showing the forward portion of the inclined conveyor and the free floating reel.
FIGS. 6A and 6B are cross-sectional views of one of the telescoping stabilizer tubes of FIG. 5 with the stabilizer tube extended in FIG. 6A and contracted in FIG. 6B.

Elevating conveyor assembly 14 includes side frame members 42 and 44 and upwardly extending screened guard pieces 46 and 48, as may be seen in FIGS. 1 and 2. An optional cover (not shown) may be secured to a plurality of upwardly extending bars 50, if desired. A pair of frame sleeve box members 52 and 54 are secured to a lower portion of side frame members 42, 44 again as seen in FIGS. 1 and 2, and serve to support and carry the elevating conveyor 14 in a manner as will be discussed hereinafter.

Figure 3:
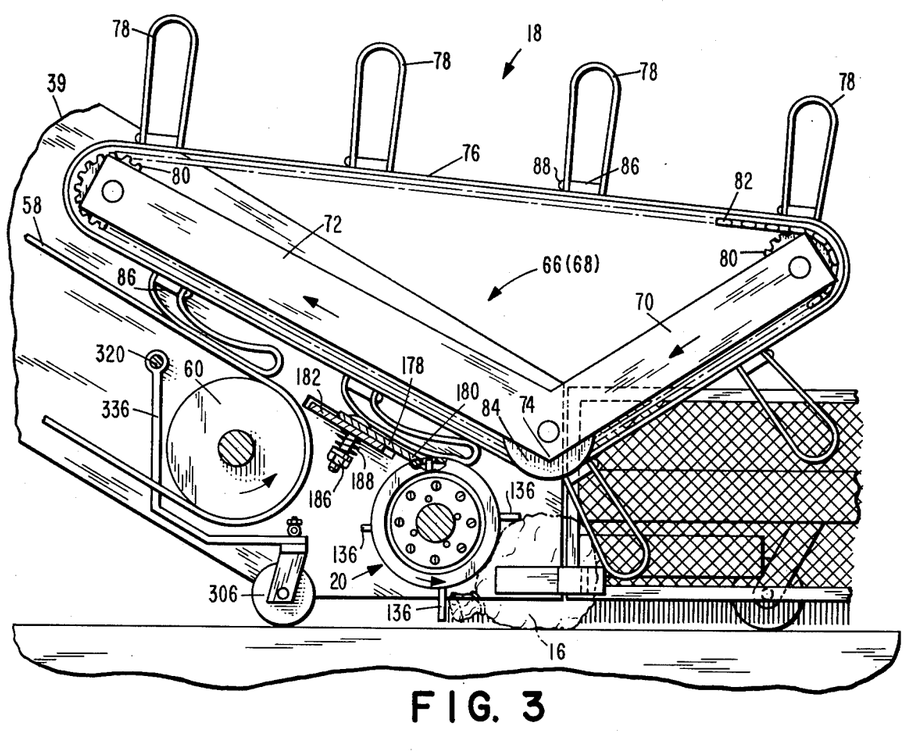
FIG. 3 is a side elevation view of the front portion of the invention, with portions removed for clarity, and showing the interaction of the floating reel and counterrotating underroller.

A suitable drive means such as a hydraulic motor 56 is positioned at the rear end 40 of elevating conveyor 14 between side frame members 42 and 44 and acts to drive a belt conveyor 58, as may be seen in FIGS. 2 and 3. Belt conveyor 58 is carried by suitable rollers 60 such as may be seen in FIG. 3 and is an endless, generally smooth or scored surface belt which carries bags of trash 16 up elevator conveyor assembly 14 for deposition into compactor 32. It will be understood that the power to operate hydraulic motor 56 is provided by the power plant of truck 12, as previously indicated, and that belt conveyor's 58 tension may be adjusted by suitable conventional means not shown. It will also be understood that suitable cleats or flaps (not shown) could be incorporated in belt conveyor 58 if necessary to prevent downward slippage of objects being conveyed upwardly. However, in actual usage it has been found that such cleats or flaps are not necessary and that scoring of the belts surface such as shown at 62 in FIG. 4 will be adequate to prevent downward slippage of bags of trash 16 so long as the upward inclination of the conveyor assembly 14 is not too great. Belt 58 will also be understood to be provided with suitable means (not shown) for facilitating its removal and replacement when it becomes worn.

Actuation of the hydraulic motor 56 will cause belt conveyor 58 to move in a generally counterclockwise direction as seen in FIG. 3 so that bags of trash 16 picked up by underroller 20 and carried onto belt 58 by floating reel 18 will move up the conveyor assembly 14, as may be seen in FIG. 1. The guard pieces 46, 48 insure that the bags of trash 16 will not fall off belt 58 but will be carried upwards to the rear end 40 of the conveyor 14. The hydraulic motor 56 may directly drive one of the rollers 60 and the several rollers may be driven by each other, as by connecting them with suitable drive belts such as 64 in FIG. 4. It will be understood that belt conveyor 58's tension will be adjusted so that rollers 60 will slip should belt conveyor 58 become jammed. Hydraulic motor 56 may also be reversible as desired to allow for a reversal of direction of movement of belt conveyor 58, again in case of jamming or the like.

Once again referring to FIG. 1, fully free floating reel, generally at 18, is positioned at the forward end of elevator conveyor 14 and generally thereabove. As may be seen in FIGS. 1-3, free floating reel assembly 18 is generally triangular in shape and includes a pair of V-shaped frames 66 and 68, each of which has a forwardly extending arm 70 and a rearward arm 72. Arms 70 and 72 are joined at their inner ends at point 74 to form the lower point of each of the V-frames 66 and 68. A suitable flexible belt 76 which carries a number of outwardly extending flexible flaps or cleats 78 arranged in rows across the face of belt 76, as seen in FIG. 2 is supported for movement about reel assembly 18. A suitable hydraulic motor (not shown) is mounted on V-frames 66 and 68 and drives belt 76 as by a series of toothed sprocket wheels 80 and chain 82, such as may be seen in FIG. 3. The sprocket wheels are affixed to the ends of suitable rollers 84 about which flexible belt 76 is carried. Belt 76 rotates in a clockwise direction, as viewed in FIG. 3 and as shown by the arrows thereon.

Directing attention again to FIG. 3, it will be seen that the interaction of the underroller assembly 20, which rotates in a counterclockwise direction, and the floating reel assembly 18 causes a bag of trash 16 to be picked up and carried onto the belt conveyor 58 of the elevator conveyor assembly 16. The flexible flaps or cleats 78, which are secured in rows to the outer face of belt 76 by suitable means such as by attachment to blocks 86 carried on belt 76 by screws 88, will push the bag of trash onto belt conveyor 58. These flaps 78 are flexible enough to deform when they contact belt conveyor 58 but are resilient enough to insure that they do not allow a bag of trash 16 or the like to slide thereunder. The speed of movement of belt 76 is equal to, or slightly faster than, the speed of belt conveyor 58 so that trash carried along by flaps 78 will be pushed onto belt conveyor 58 and forced up the conveyor. A cover 90 may be provided over floating reel 18 so that any trash which may catch in flaps 78 will not be thrown up and out of the path of the pickup machine but will instead be carried under cover 90 and thrown ahead into the machine's path.

As has been indicated above, reel assembly 18 is fully free floating so that it will be capable of generally vertical movement in response to varying sizes of bags of trash and the like. This movement of reel assembly 18 is accomplished automatically in response of bags of trash and the like. This movement of reel assembly 18 is accomplished automatically in response to the size of the article of trash and allows reel 18 to function effectively to urge trash onto belt conveyor 58 without rupturing plastic bags, crushing cardboard cartons or causing similar damage which would allow the trash carried in these containers to be spilled. This freedom of movement of reel assembly 18 is allowed by a multi-component mounting system which allows vertical movement of portions of the reel assembly 18 as it carries bags of trash 16 or the like to belt conveyor 58.

As may be seen in FIGS. 1 and 2, a pair of stabilizer arms 92 and 94 extend generally upwardly from a lower portion of forward end plates 38, 39. Stabilizer arms 92, 94 are pivotably secured to the end plates 38, 39 as, for example, by passing a pivot pin 96 through a circular fitting 98 at the bottom of each stabilizer arm as may be seen in FIGS. 1 and 7. As may be seen most clearly in FIG. 2, a mounting pin 100 is secured to each of the V-shaped frames 66, 68 of reel assembly 18 generally at the juncture 74 of the forward and rear V-arms 70 and 72. Pins 100 extend outwardly from the reel and are pivotably received in corresponding sliders 102 which are free to move up and down on stabilizer arms 92 and 94. These sliders are, in turn, joined through adjustable turnbuckles 104 to a forwardly extending leg 106 of a first cantilever arm 108. This first cantilever arm 108 is pivotably attached to the side frame members 42 (44) of elevator conveyor assembly 14 by, for example, pivot pin 110. An upwardly extending leg portion 112 of first cantilever arm 108 is biased rearwardly by a tension coil spring 114 extending from leg 112 to a tab 116 secured to frame sleeve box members 52 (54), all as may be seen most clearly in FIG. 1. A brace 118 runs between legs 106 and 112 of first cantilever arm 108.

A bag of trash which is picked up by underroller assembly 20 and is carried onto belt conveyor 58 will act to cause the reel assembly 18 to raise up. As the forward portion of reel assembly 18 is moved upwardly by a bag of trash, pivot pin 100 will cause slider 102 to move up on stabilizer arm 92, 94. Since the first cantilever arm 108 is free to pivot about pin 110, the stabilizer arms 92, 94 will correspondingly pivot about pin 98. The tension of spring 114 can be adjusted, as can its point of attachment to leg 112. Additionally, turnbuckle 104 can be adjusted to vary the effective distance between pivot 110 and slider 102. This combination of stabilizer arms 92, 94, sliders 102, first cantilever arms 108 and springs 114 thus allows the reel assembly to move generally vertically to accomodate bags of trash of varying size as the bags are initially engaged by the reel.

As the bags of trash or the like are carried upwardly on belt conveyor 58, but are still being contacted by belt 76 and flaps 78 of the floating reel, it will be seen that it is necessary for the rear portion of reel assembly 18 to also be able to move up and down. As may been seen in FIG. 2, a connecting ear 120 extends outwardly from the rear of each rearward V arm 72 of the V frame 66, 68. A connecting bar 122 is pivotably secured, at one end, to the outer portion of connecting ear 120 and is pivotably joined, at its other end, to a forwardly extending leg 124 of a second cantilever arm 126. Second cantilever arm 126 is also pivotably connected to the side frame members of elevator conveyor assembly 14 by a pivot pin 128 and has an upwardly extending arm 130 which is, in turn, biased rearwardly by a second tension coil spring 132, connected through a suitable adjusting turnbuckle 134 to side frame 42, 44. Arms 124 and 130 of second cantilever arm 126 are secured to each other, as by welding, so there is not required a brace similar to brace 118. It will now be seen that as the bag of trash moves up belt conveyor 58 but while it is still between the belt 58 and the belt 76 of the reel 18, the rear end of floating reel 18 will be able to move upwardly and slightly forwardly to adjust to the size of the bag of trash. The tension of spring 132 may be varied by movement of the connection point of the spring to arm 130 and by adjustment of the turnbuckle 134 so that more or less freedom of movement of the rear of reel assembly 18 may be provided.

It may thus be seen that the mounting of freely floating reel assembly 18 by the combination of stabilizer arms 92, 94 and by the use of first and second cantilever arms 108 and 126, respectively, allows the reel assembly to move up and down in response to the size of the object, such as a bag of trash 16, which is being picked up by the apparatus and carried up the elevator conveyor assembly 14. This mounting of the reel insures that the various containers of trash will not be ruptured or broken but will remain intact from their initial contact with the trash pickup machine until they are deposited in the compacting portion 32 of the apparatus. In actual usage it has been found that the floating reel of the present invention is capable of handling commercially available disposable plastic bags filled with wet lawn cuttings without the bag being broken during passage through the reel assembly. The fully floating reel 18 functions completely independantly and does not require any control by the operator of the vehicle. When a number of bags of trash or the like are to be picked up in rapid succession, both the first and second cantilever arm assemblies function generally independantly to allow the reel assembly to rise and fall each time a bag of trash or the like passes therethrough. The limits of movement of the full floating reel could, of course, be exceeded by attempting to pick up too large a container of trash and to this extent attention of the truck operator is required. However, in the great majority of circumstances, the reel assembly 18 will be capable of sufficient height adjustment, by means of the cantilever arm assemblies, to adjust to the varying sizes of containers of trash encountered by the apparatus.

As was discussed briefly above, the picking up of a bag of trash 16 and its placement on belt conveyor 58 is caused by the coaction of freely full floating reel assembly 18 and the counterrotating underroller assembly 20. As may be seen in FIG. 3, underroller 20 turns, in a counterclockwise direction and initially lifts a bag of trash 16 or the like up from the surface the bag has been resting on, and into engagement with the cleats or flaps 78 of the foating reel assembly 18. As may be seen in FIG. 3, underroller assembly 20 is provided with a number of extending and retracting cleats or blades 136 with each of these blades or cleats being in its fully extended position at the bottom of underroller 20 and at its fully retracted position at the top of underroller 20.

Figure 4:
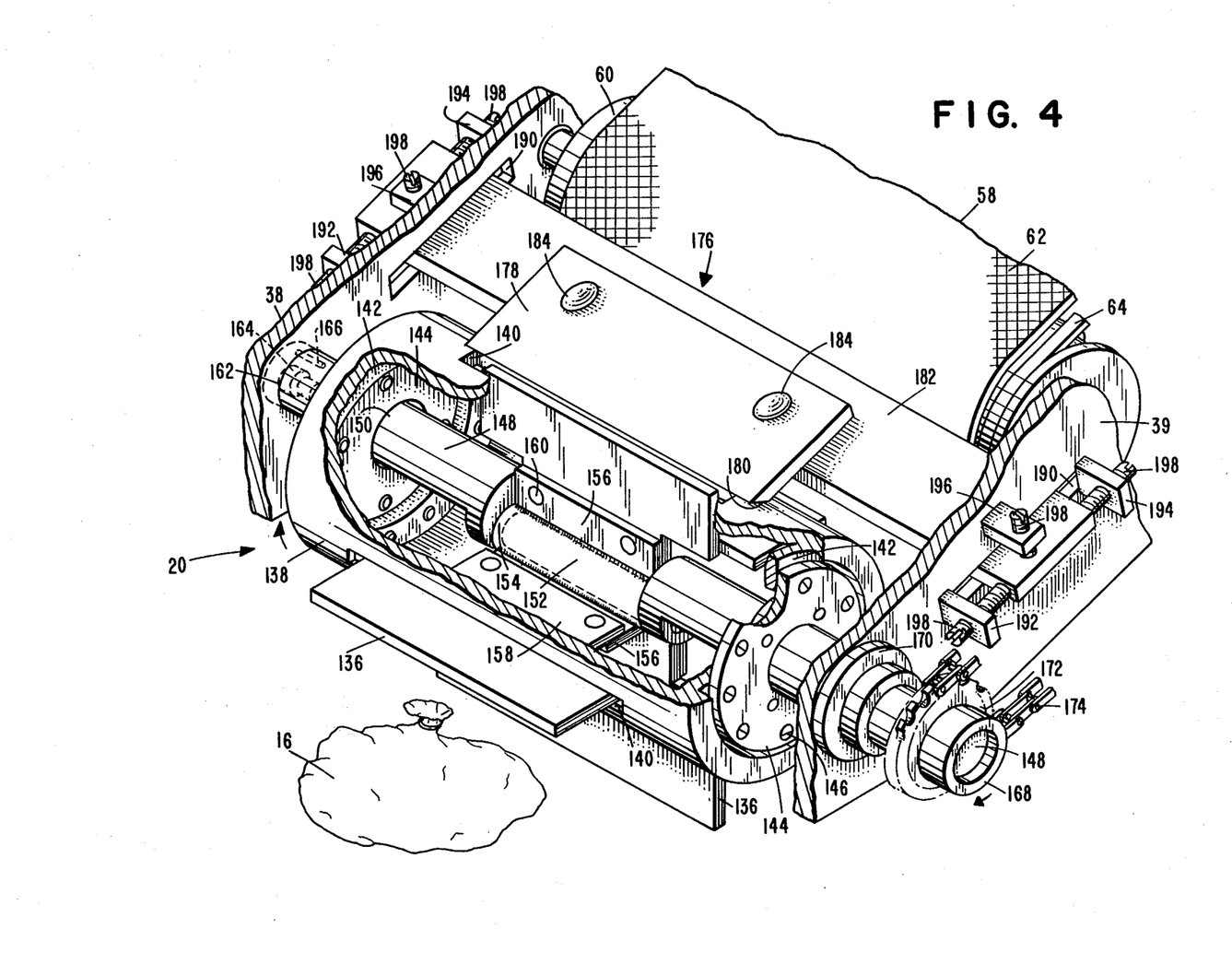
FIG. 4 is a perspective view, partly in section, of the underroller and its cleats together with the adjustable scraper blade.

Turning now to FIG. 4, the structure and operation of underroller assembly 20 will be discussed in detail. As may be seen, underroller 20 is supported between the forward end plates 38, 39 of elevator conveyor assembly 14 with the underroller rotating in the same direction as belt conveyor 58; i.e., counterclockwise as viewed in FIG. 3. A hollow cylinder 138 forms the outer portion of underroller 20 and is provided with a plurality of laterally extending openings or slots 140 through which the extending and retracting cleats 136 extend. Inwardly extending flanges 142 are provided near the ends of cylinder 138 and discoid end plates 144 are secured to these inwardly extending flanges by suitable means such as screws 146 which pass through the periphery of discs 144 and into flange 142.

A center crankshaft 148 is positioned in hollow cylinder 138 and passes through central apertures 150 in discoid plates 144. A middle portion 152 of crankshaft 148 is offset downwardly from the ends of the crankshaft and this central portion 152 has journaled therearound a hub 154 which is free to rotate about middle portion 152 of the crankshaft 148. Hub 154 has a number of outwardly extending webs 156 welded or otherwise rigidly secured thereto with the number of such webs corresponding to the number of openings or slots 140 formed in cylinder 138. A generally paddle shaped resilient member 158 is secured to each such web as by use of bolts 160 with the outer end of each such paddle member 158 extending through a slot 140 to form a blade 136.

As viewed in FIG. 4, the left end of crankshaft 148 passes through an opening 162 in forward end plate 38 and is retained in place by a bolt 164 and is further prevented from rotating by the insertion of a lock pin 166 which is inserted into a corresponding hole in the end of crankshaft 148. At the other forward end plate 39, crankshaft 148 is disposed within a cylindrical shaft 168 which, in turn, rides in a bearing 170, secured to the end plate 39 by any suitable means. At its outboard end, shaft 168 is provided with a toothed sprocket wheel 172 about which runs a drive chain 174. Drive chain 174 is driven by a suitable connection (not shown) with roller 60 which, in turn, is driven by the hydraulic motor 56 of the elevator conveyor assembly 14. The inner end of hollow shaft 168 is securely fastened, as by welding, to discoid plate 144, which, it will be remembered, is secured to flange 142 of cylinder 138.

In operation, shaft 168 is driven by rotation of roller 60 and transmits its rotation to discoid plate 144 which, in turn, causes cylinder 138 to rotate. The rotation of cylinder 138 causes blades 136 to rotate with hub 154 about the middle offset portion 152 of crankshaft 148. Since the centers of rotation of cylinder 138 and hub 154 are offset, the blades 136 extend and retract through slots 140 as the hollow cylinder 136 is caused to rotate by shaft 168. In other words, central crankshaft 148 remains stationary while hollow cylinder 138 rotates to carry blades 136 in and out in slots 140. As may be seen in FIG. 4, each such blade 136 is fully extended when it is at the lower portion of cylinder 138 and is fully retracted when at the upper side of the cylinder. In this way, each blade engages a bag of trash 16 or the like and carries it upwardly and ahead to lift the bag of trash up from the surface it has been resting on. The coaction of underroller 20's blades 136 and the flaps 78 of the free floating reel assembly 18 can be most clearly seen in FIGS. 2 and 3.

Referring again to FIG. 4, it may be seen that a scraper or doctor blade assembly, generally at 176, is provided for operation with underroller assembly 20. Scraper assembly 176 acts to dislodge any articles of trash which may become trapped in slots 140 of the rotating cylinder 138 of underroller assembly 20. As may be seen in FIG. 4, scraper blade assembly 176 is provided with a generally rectangular scraper blade 178 which has a leading beveled edge 180 positioned slightly above or riding on the surface of cylinder 138. Scraper blade 178 is secured to a transverse support bar 182 by means of a pair of spaced bolts 184 which, as may be seen in FIG. 3, pass through blade 178, and support bar 182 and are secured by nut and washers 186. Springs 188 are placed around the shank of bolts 184 between nut and washers 186 and the lower side of support bar so that the scraper blade 178 will be capable of being forced up out of contact with cylinder 138 should an object too large for the blade to dislodge become stuck in slots 140 of cylinder 138.

As may also be seen in FIG. 4, the positioning of doctor blade 178 with respect to cylinder 138 of underroller assembly 20 is adjustable due to the mounting of support bar 182. Bar 182 extends through elongated slots 190 in the forward end plates 38, 39 of elevator conveyor assembly 14. These slots 190 are of slightly greater height and are considerably longer than the height and width respectively of support bar 182. A set of front, rear, and above extending tabs 192, 194 and 196, as may be seen in FIG. 4 extend outwardly from the ends of and above slots 190. Set screws 198 pass through these ears 192, 194 and 196 to engage the ends and top portion of support bar 182. To position support bar 182 and hence scraper blade 178 with respect to rotating cylinder 138, it is only necessary to turn set screws 198 until the bar is positioned as desired. Set screw 198 extending downward from top tab 196 may or may not be tightened down into engagement with bar 182. If it is not, since slot 190's height is slightly greater than the thickness of support bar 182, the bar can deflect upward slightly in response to upward movement of the scraper blade 178. This is an added margin of safety should blade 178 encounter something it cannot dislodge from rotating cylinder 138. Support bar 182 can also be adjusted along the length of slot 190 to change the spacing between blade 178 and rotating cylinder 138 to compensate for blade wear and the like.

Referring now to FIGS. 1 and 2 guide wing assembly 22 is carried at the extreme forward end of trash pickup assembly 10 and, as indicated previously, is intended to guide bags of trash 16 or the like into position to be acted on by underroller 20 and free floating reel 18. As may be seen in FIG. 2, a pair of guide wings 200, 202 are pivotably secured to the forward edge of the forward end plates 38, 39 by suitable pivot pins 204. Each guide wing is generally of elongated rectangular shape and the wings are flared outwardly as may best be seen in FIG. 2. A circular end piece 206 is carried at the forward end of each wing and has an outer peripheral shoe 208 of increased thickness. Each guide wing 200, 202 consists of an outer frame 210 of, for example, steel bars with wire mesh 212 placed within framing 210. In addition, brushes 214 are secured to the bottom of frame 210 and perform somewhat of a sweeping action.

As indicated above, these guide wing assemblies act to guide or "funnel" bags of trash 16 or the like toward underroller 20 and free floating reel 18. Should the forward portion of a wing contact a solid, immovable object, the wing is free to deflect upwardly on pivot pins 204, thus preventing breakage or damaging of the guide wing assembly 22.

Figure 5:
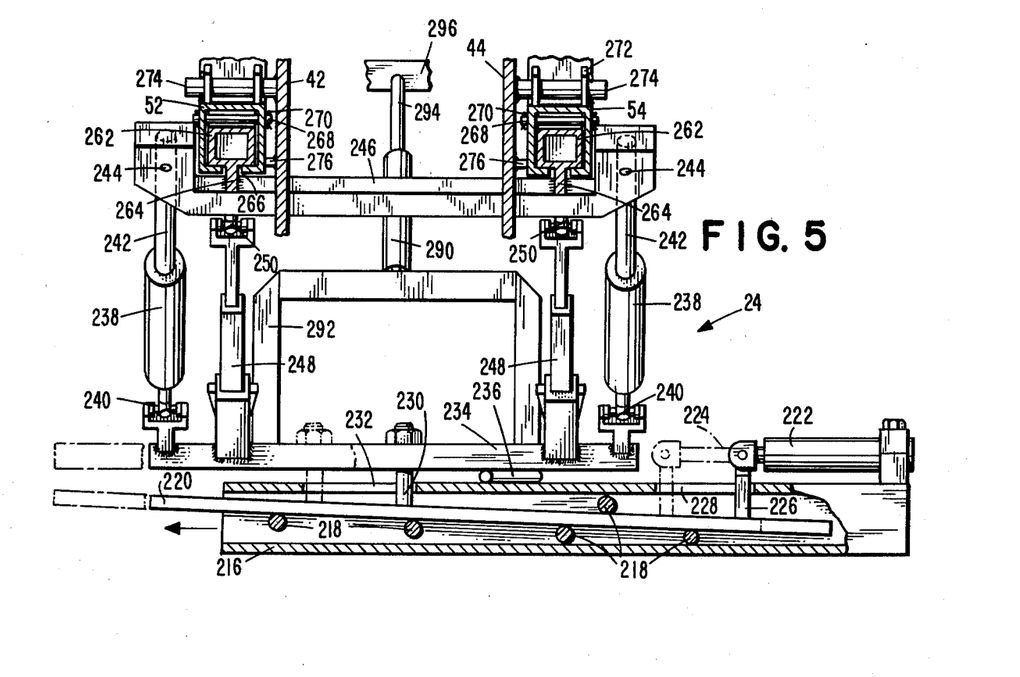
FIG. 5 is a front elevation view, partly in section, taken along line 5—5 of FIG. 1 and showing the front elevating and turning bolster assembly of the invention.

Referring now to FIGS. 1 and 5, the mounting of the trash pickup assembly 10 to truck 12 will be discussed. As previously indicated, the pickup assembly is carried by truck 12 by means of a front elevating and mounting assembly and turning bolster, generally at 24 in FIG. 1, and by a ball and socket assembly, generally at 26, also as seen in FIG. 1. Front elevating and mounting assembly and turning bolster 26 will be discussed initially and may be seen most clearly in FIG. 5, the front elevation view taken at line 5—5 in FIG. 1. Assembly 24 performs several important functions for it is the means by which the forward end of the pickup assembly is supported and also provides the means for automatically adjusting the elevation of the forward end of the pickup assembly in response to changing surface heights, as will be discussed hereinafter. Further, assembly 24 mounts the pickup assembly 10 to truck 12 in a manner which allows movement of the pickup apparatus to the side of the truck, if desired.

As may be seen in FIG. 1, assembly 24 is joined to truck 12 by affixing a hollow, box-like bolster or mounting sleeve 216 to the front bumper 36 of truck 12 by any suitable means such as welding or the like. Box-like mounting sleeve 216 runs generally the length of truck bumper 216. As may be seen in FIG. 5, box-like sleeve 216 carries a number of interior rollers 218 with the rollers supporting a sliding bar 220 thereon. Rollers 218 are inclined across box-like sleeve 218 so that sliding bar 220 is elevated to the left, as shown in FIG. 5. A suitable hydraulic turning cylinder 222 is secured to the right end of sleeve 216 with the cylinder rod 224 portion of cylinder 222 being connected to an upstanding rod 226 which passes through a suitable slot 228 in sleeve 216 and, in turn, is affixed to the right end of sliding bar 220. It will thus be seen that extension of cylinder rod 224 will extend sliding bar 220 to the left and that retraction of cylinder rod 224 will retract sliding bar to the right. An upwardly extending mounting bolt 230 is secured to a central portion of sliding bar 220 and passes upwardly through a corresponding slot 232 in sleeve 216. Mounting bolt 230 is joined to a base support bar 234 which is free to pivot on bolt 230. As may be seen in FIG. 5, support bar carries the remainder of assembly 24 as will be discussed shortly.

The above described sleeve 216, sliding bar 220, cylinder 222 and their associated components provides a turning bolster for use in allowing the trash pickup assembly to be swung laterally to the side of the truck to facilitate the removal of trash from curbs, sidewalks and the like. As cylinder rod 224 is extended, slide bar 220 moves to the left to carry base support bar 234 and hence trash pickup assembly also to the left, as viewed in FIG. 5. While slide bar 220 must extend outwardly in a straight line, base support bar 234 is free to pivot on mounting bolt 230. This pivoting capability, in combination with ball and socket mount 26, allows the trash pickup assembly to move laterally to the side of truck 12 without warping or twisting. The inclination of slide bar 220 serves to prevent twisting of the pickup assembly. As the entire assembly is moved out to the side of the truck, the movement of weight outwardly will effect a change on the truck's suspension, causing a compression of the suspension at the right front wheel which would tend to lower the front of the pickup assembly 10. Since slide bar 220 is inclined upwardly in mounting sleeve 216, the pickup assembly will rise slightly as it is shifted outwardly. This rise will compensate for the compression of the truck's suspension with the net result being that the conveyor remains approximately at the same height as it moves laterally away from or back toward the truck. An anti-tilt bar 236 supports the right end of base support bar 234, as viewed in FIG. 5, when it is moved and insures that the support bar and hence the remainder of the mounting and elevating assembly 24 remains level.

A pair of elevating hydraulic cylinders 238 are positioned at the outboard ends of base support bar 234 and are joined thereto by suitable universal joints 240. The upwardly extending cylinder rods 242 of elevating cylinders 238 are pivotably connected by suitable pivot pins or the like 244 to the ends of a support channel 246. Inboard of elevating cylinders 238, a pair of telescoping stabilizers 248 are secured to base support bar 234 and are connected to support channel 246 by suitable universal joints 250. These telescoping stabilizer tubes are shown in more detail in FIGS. 6A and 6B and may be seen to be comprised of a base tube 252, which is welded or otherwise secured to base support bar 234, an intermediate tube 254 which telescopes in base tube 252 and a slide rod 256 which slides in intermediate tube 254. Latching teeth 258 are springedly affixed to an upper portion of base tube 252 and engage detents 260 in intermediate tube 254 to prevent withdrawal of intermediate tube 254 from base tube 252. This telescoping stabilizer 248 provides a compact structure which has the ability to extend to several times its initial length.

Returning to FIG. 5, a pair of box-shaped channel rails 262 are secured inside of the frame sleeve box members 52, 54, above support channel 246 by support webs 264 with the webs being welded to support channel 246 and to channel rails 262. The webs pass upwardly through elongated apertures 266 in the frame sleeve box members 52, 54. Sleeve box members 52, 54 are provided with a suitable number of rollers 268 which pass through frame sleeve box members 52, 54 and are retained in place by cotter pins 270 or the like. It will thus be seen that support rails 262 and frame sleeve box members 52, 54 are movable with respect to each other with the channel rails 262 being stationary and the frame sleeves 52 sliding thereon on the rollers 268. Spaced pairs of upstanding apertured ears 272 are joined to the frame sleeve box members 52, 54 and act as hangers for the side frame members 42, 44 of elevator conveyor assembly 14. Side frame members 42, 44 have outwardly extending hanger rods 274 which pass through ears 272, and side frame members 42, 44 are further provided with spacing tabs 276 which rest against the inner sides of frame sleeve box members 52, 54.

Turning again to FIG. 1, ball and socket mount 26 includes a socket 278 secured to the frame 28 of truck 12 by a suitable bracket 280, and a corresponding ball 282. Ball 282 is secured to the lower end of an upwardly extending conveyor support 284 which is generally T-shaped and has outwardly extending arms 285. A web plate 288, similar to web plate 264 of assembly 24 is secured to the end of each T-arm 285 and is also secured to the bottom of the support channel rail 262, as may be seen in the cut-out portion of FIG. 1.

As may also be seen in FIGS. 1 and 5, a retracting cylinder 290 is secured, at one end, to the cross piece of a generally inverted U-shaped member 292 with the legs of the U-shaped member 292 being secured to base support bar 234. The cylinder rod 294 is affixed to a cross bracket 296 which, in turn, is secured to the movable frame sleeve box members 52, 54.

It will now be seen that, as retracting cylinder 290 is actuated, frame sleeve box members 52, 54 will move on rollers 268 with respect to support channel rails 262 which are held stationary by their connections through webs 264 and 288 to support channel 246 and conveyor support arms 286, respectively. Accordingly, actuation of retracting cylinder 290 will move the entire trash pickup apparatus 10 either forwardly or rearwardly on truck 12. At the same time, elevating cylinders 238 may be actuated to raise or lower the forward portion of the pickup assembly 10 in order to adjust the spacing between the underroller assembly 20 and the surface from which the trash is to be removed. This raising and lowering of the forward portion of the pickup assembly 10 can take place because of the ball and socket assembly 26 which allows the rear portion of the elevating conveyor assembly 14 to also move vertically in inverse respect to the motion of the front portion of the apparatus.

While the retracting cylinder is retracting or extending the elevator conveyor and the elevating cylinders are raising or lowering the assembly, the turning cylinder 222 may be actuated to move the pickup assembly laterally either away from or back toward the truck. All of these compound movements may take place at the same time without bending, warping, or twisting the elevating conveyor 14 due to the interaction of the sleeve 216 and slide bar 220 of the turnng bolster; the pivoting of the base support bar 234 on mounting bolt 230; the freedom of movement allowed the elevating cylinders 238 and the telescoping stabilizer tubes 248 by their associated universal joint connections 240 and 250 to the base support bar 234 and support channel 236, respectively; and the multiple turning and pivoting allowed by the ball and socket assembly 26. Thus, the trash pickup assembly 10 may move in a compound manner about truck 12 while not subjecting itself to binding, warping, or twisting which would have a deleterious effect on the pickup assembly. In addition, the retracting cylinder 290 and the elevating cylinders 238 may be used to elevate and retract the trash pickup assembly 10 to a non-use position when it is desired to move the assembly to a new location.

Figure 7:
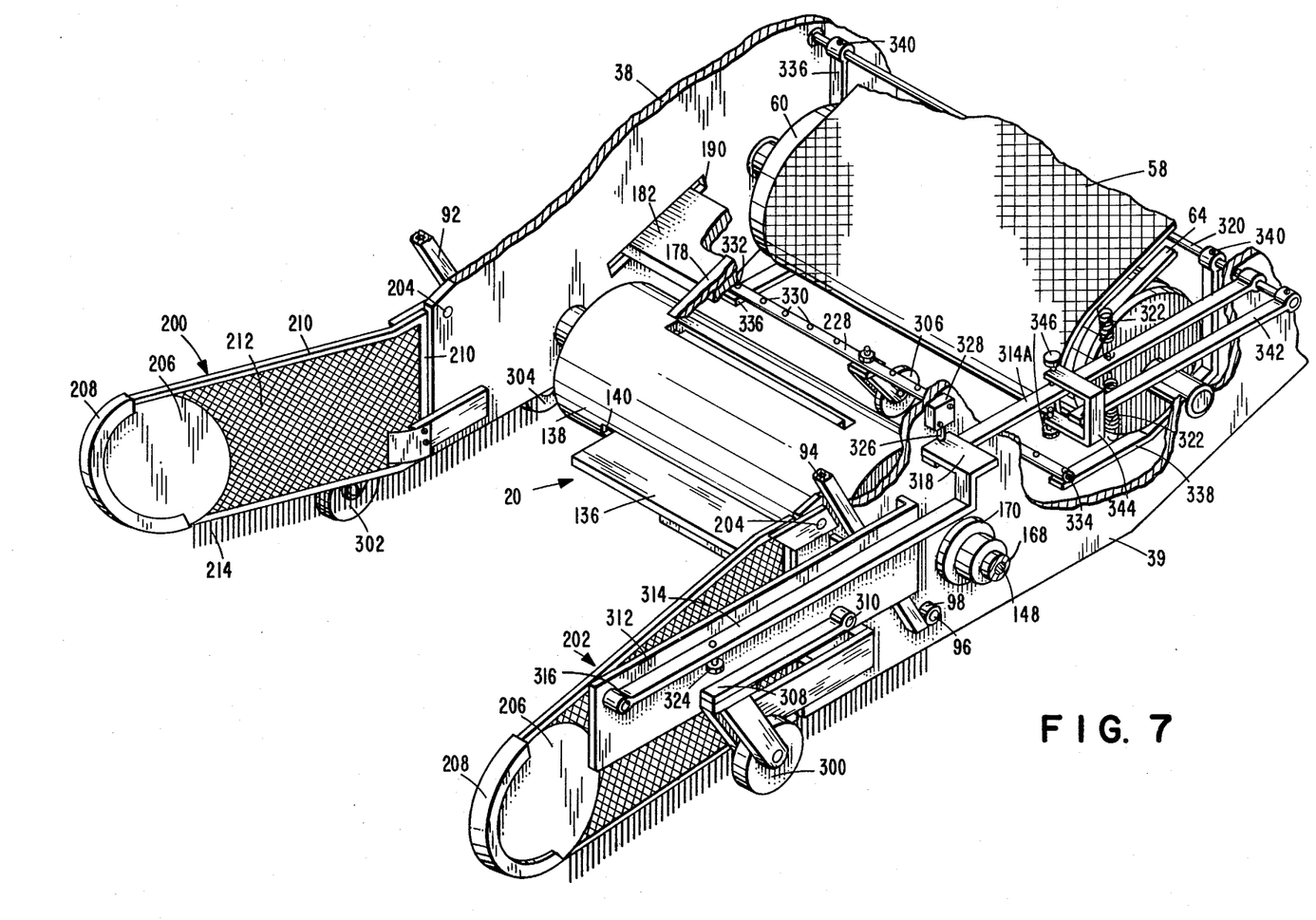
FIG. 7 is a perspective view, partly in section and with portions removed for clarity, of the front portion of the invention and showing the means for automatically adjusting the elevation of the forward end of the conveyor.
Figure 8:
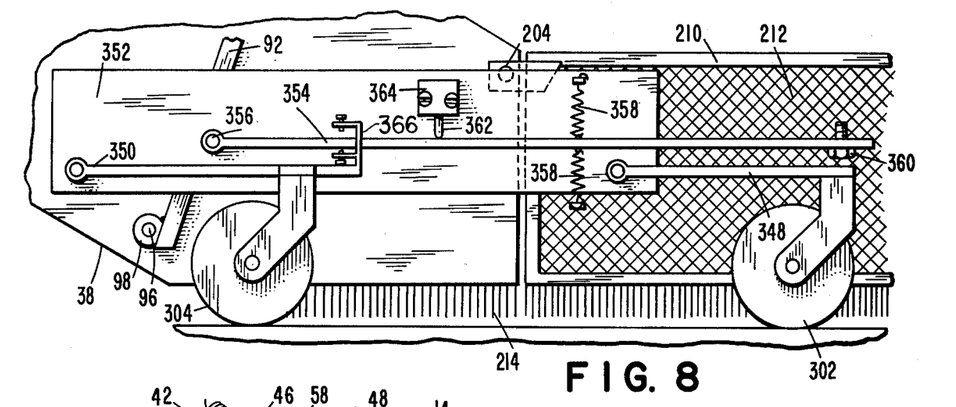
FIG. 8 is a side elevation view of the lower front portion of the invention as viewed in FIG. 2 and showing the means for automatically regulating the height of this side of the conveyor.

An additional important feature of the invention, which may be seen most clearly in FIGS. 7 and 8, is the assembly for automatically raising or lowering the forward portion of the trash pickup apparatus 10 so that the guide wing assembly 22 and the underroller will be maintained in close proximity to the surface which the bags of trash 16 or the like are to be picked up from. As may be seen in FIGS. 7 and 8, a left side gauge wheel 300, a pair of right side front and rear gauge wheels 302 and 304, respectively, and a movable interior gauge wheel 306 are provided. These gauge wheels are movably mounted and sense variations in the surface being transversed. The movement of these wheels is communicated through a system of linkage arms and rods to a plurality of microswitches to actuate the elevating cylinders 238 to change the elevation of the forward end of trash pickup assembly in a manner as will now be described. It should be emphasized that these various gauge wheels are not weight supporting but instead act only as feelers or sensors.

As may be seen in FIG. 7, left gauge wheel 300 is carried at the forward end of a mounting arm 308 which is, in turn, pivotably connected at 310 to a side plate 312 which extends forwardly from forward end plate 39 of elevator conveyor assembly 14. Wheel 300 is thus free to move up and down in response to surface variations. An elongated actuator bar 314 is pivotably affixed at a forward end 316 to side plate 312 with bar 314 being disposed above gauge wheel 300's mounting arm 308. As may be seen in FIG. 7, the actuator bar 314 extends rearwardly to a generally L-shaped switch engaging plate 318 which rests on, but is not attached to bar 314A, bar 314A thence extends further rearwardly to its movable securement about a transverse rotatable rod 320. A pair of opposed springs 322 retain actuator bar 314A in a neutral position. When gauge wheel 300 is forced upwardly, it's mounting arm 308 will contact an adjustable stop 324 on actuator 314. Actuator arm 314 will also move generally upwardly to force switch plate 318 up, thus pushing up on a switch plunger 326 of a microswitch 328 mounted on forward end plate 39. Microswitch 328, will, in turn, actuate the left elevating cylinder 238 to cause the left side of the apparatus to raise until gauge wheel 300 drops out of contact with actuator arm 314 thereby stopping the actuation of microswitch 328. It is to be noted that gauge wheel 300 does not effect a lowering of the assembly, being free to fall without actuating arm 314.

Movable interior gauge wheel 306 is, as may be seen in FIG. 7, mounted on a transverse bar 328 which is provided with a number of mounting holes 330 so that the position of interior gauge wheel 306 may be varied as desired. Transverse bar 328 is secured, at its ends 332, 334 to first ends of corresponding, generally L-shaped, connector bars 336, 338. The second end of connector bars 336, 338 are fixedly attached, as by use of screws 340, to transverse rod 320. A lever arm 342 is also fixedly secured at a first end to transverse rod 320 and carries, at its second end, a generally C-shaped actuator finger assembly 344. Adjustable bar contacting screws 346 pass through the ends of the actuator finger assembly 344 and, as may be seen in FIG. 7, are positioned above and below actuator bar 314A intermediate the bar's switch plate 318 and its rear connection to transverse rod 320. It will now be seen that as gauge wheel 306 for example falls, connector bars 336, 338 will also move downwardly, causing rod 320 to rotate counterclockwise. Rotation of rod 320 will cause lever arm 342 to pivot down until upper screw 346 contacts actuator bar 314A to move switch plate 318 down, allowing plunger 326 of microswitch 328 to fall. Microswitch 328 is double acting; i.e., forms a signal with movement of plunger 326 in either direction, so that the downward movement of plunger 326 will act to cause left elevating cylinder 238 to lower the left side of the assembly until gauge wheel 306 again contacts ground and switch plate 318 returns to its neutral position. Should gauge wheel 306 be moved upwardly, connector bars 336 and 338 will cause rod 320 to rotate in a clockwise direction moving lever 342 upwardly and causing switch plate 318 to force plunger 326 up to cause the elevating cylinder to raise the left side of the assembly. Since gauge wheel 300 only can act to raise the left side of the assembly, a depression in the surface will not effect the height of the trash pickup assembly until it is sensed by gauge wheel 306. This insures that the front of the assembly will not be lowered prematurely so that it will not run as much of a risk of striking the ground.

Referring now to FIG. 8, the right side gauge wheel assembly may be seen. Both right side gauge wheels 302 and 304 are carried on movable mounting arms 348 and 350, respectively, and each mounting arm is pivotably connected to a side plate 352 secured to forward end plate 38 of elevator conveyor 14. An actuator bar 354 is pivotably connected at a first end 356 to side plate 352 and extends forwardly above mounting arms 348 and 350 for right side front and rear gauge wheels 302, 304, respectively. A pair of opposed springs 358 are connected to actuator bar 354 at a point along its length and serve to retain bar 354 in its neutral position. In operation, as front gauge wheel 302 is forced upwardly, it contacts an adjustable stop 360 on a forward end of actuator bar 354 causing the bar to rise. Upwardly motion of bar 354 will force a plunger 362 up into a second microswitch 364 which will, in turn, emit a signal to right elevating cylinder 238 to raise the right side of the machine. Again, as with left gauge wheel 300, right front gauge wheel 302 is a one-way device and is free to fall without effecting a drop in the elevation of the pickup apparatus. Right rear gauge wheel 304's mounting arm carries a C-shaped actuator finger assembly 366 similar to actuator 344. Movement either up or down of rear right gauge wheel 304 will cause a corresponding movement in bar 354 which will, in turn, move switch plunger either up or down to cause two way microswitch 364 to actuate right elevating cylinder 238 to either raise or lower the right side of the pickup assembly.

The combination of the four gauge wheels and their associated switches and controls, as set forth above, provides an automatic means for adjusting the position of the front end of the pickup assembly to insure that the guide wing assembly 22 and the underroller assembly 20 are always in the proper operating location. Since forward gauge wheels 300 and 302 act only to raise the assembly, there is little possibility of the assembly being lowered prematurely so that the assembly will not actually hit the surface. If the rear guide wheels 304 and 306 are in a small depression and signal for the assembly to be lowered, if the depression is short lived, the forward gauge wheels 300, 302 will already be sensing the rise in the surface and will counteract the depression sensed by the rear wheels. This adjusting assembly thus allows for raising or lowering of the front of the elevator conveyor 14 in response to significant surface height changes but effectively damps out minor variations.

In operation, the trash pickup apparatus of the present invention can be controlled by one person who drives the truck and can control the entire operation from the truck's cab. The truck is initially driven from a central or municipal garage area of the like to the starting point of trash pickup with the pickup assembly 10 in its retracted and elevated position. Upon arriving at a starting point, the operator extends the assembly forwardly by actuation of retracting and extending cylinder 290 thus causing the frame sleeve box members 52, 54 to ride on their rollers 268 on the support channel rails 262 which, as has been previously discussed, remain fixed through their attachments to the T support arm 286 of the ball and socket assembly 26 and to the support channel 246 of front elevator and turning bolster assembly 24. The pickup assembly may be simultaneously moved laterally to the side of the truck if the trash to be picked up has been deposited on the curb or sidewalk instead of on the road surface. Again, as has been discussed previously, the inclined sliding bar 220 which rides in the box-like mounting sleeve 216 will compensate for compression of the truck's suspension as the front of the pickup assembly is swung outwardly. Whether the pickup assembly is to be swung to the side of the truck or is to be only extended forwardly, the front elevating cylinders 238 are actuated from the cab of the truck to lower the front of the assembly until the various gauge wheels 300, 302, 304, and 306 take over from the operator and automatically adjust the front elevating cylinders 238 to properly position the front of the pickup assembly just above the surface.

The truck may now be moved forwardly at a moderate rate of speed, the operator having actuated the hydraulic motors to put the underroller assembly 20, the belt 76 and flaps 78 of the free floating reel 18 and the belt conveyor 58 of the elevating conveyor assembly into motion. The guide wings 200, 202 sweep or funnel the bags of trash 16 or the like toward the underroller assembly 20 where the trash is engaged by an extended cleat 136 and is lifted up and ahead. At the same time, the flaps 78 of the free floating reel are also moving toward the trash and the coaction of the cleats 136 and flaps 78 carry the trash onto belt conveyor 58. Since reel assembly 18 is free floating with its mounting being provided by the stabilizer arms 92, 94 and the first and second cantilever arm assemblies 108 and 126, as has been discussed previously in more detail, the reel assembly 18 will be able to float or move generally up and down to firmly engage the articles of trash while urging it onto the belt conveyor but will not cause breakage or rupturing of these containers.

As the truck progresses along, the gauge wheels continually are in contact with the surface and relay any changes along to the elevating cylinders 238 which adjust the height of the assembly as, and when necessary. The stabilizer tubes 248 and the various universal joints act to keep the pickup assembly level and prevent warping and twisting of the elevating conveyor's frame. The articles of trash are carried up the belt conveyor until they drop into the truck's compacting unit 32. When the truck is full or the route completed, the driver again actuates the elevating cylinders 238, the turning cylinder 222 if the pickup assembly has been in operation at the side of the truck, and the retracting cylinder 290 to raise the pickup apparatus and return it to its nonoperating position.

It will thus be seen that there has been described an automatic trash pickup machine in which a fully free floating reel coacts with a counterrotating underroller to pick up trash from a supporting surface and urge it onto an inclined elevating conveyor for deposit in a truck. The pickup assembly is mounted on the truck in a manner and by suitable means which allow wide flexibility of operation and movement while eliminating the risk of twisting or warping the elevating conveyor assembly. Additionally, the present invention includes means for automatically sensing variations in surface height and adjusting the position of the foward end of the pickup assembly accordingly.

While a preferred embodiment of an automatic trash pickup machine in accordance with the present invention has been fully and completely described hereinabove, it will be obvious to one of ordinary skill in the art that a number of changes could be made to the apparatus without departing from the true spirit and scope of the invention and accordingly the scope of the invention is to be limited only by the appended claims:

I claim:

1. In an automatic trash pickup apparatus movably mounted on a vehicle for picking up trash and conveying the trash to a storage area of the vehicle; the pickup apparatus including an inclined elevating conveyor extending generally forwardly of the vehicle, the elevating conveyor carrying trash from a surface on which it has been placed to the storage portion of the vehicle the trash being carried onto a forward end of the elevating conveyor by coacting reel and underroller assemblies mounted to the forward end of the elevating conveyor, the improvement comprising:

free floating mounting means for mounting said reel assembly to the forward end of the inclined elevating conveyor for movement in both horizontal and vertical directions whereby said reel assembly will be freely floating in response to variations in the size of the trash being picked up.

2. The apparatus of claim 1 wherein said free floating reel assembly is generally triangular with the apex of the triangle being disposed generally slightly above and forward of the forward end of the elevating conveyor.

3. The apparatus of claim 1 wherein said means for mounting said free floating reel assembly includes at least two generally vertical pivotable stabilizer arms, said stabilizer arms extending upwardly from the opposing sides of the forward end of the elevating conveyor, said free floating reel assembly being slidably secured to said stabilizer arms by sliders.

4. The apparatus of claim 3 wherein said mounting means further includes first and second pairs of cantilever arm assemblies, said cantilever arm assemblies interconnecting the elevating conveyor and said reel.

5. The apparatus of claim 4 further wherein said first cantilever arm assemblies are affixed at a forward end to said sliders and are yieldably affixed at a rear end to the elevating conveyor's frame.

6. The apparatus of claim 5 further wherein said second cantilever arm assemblies are pivotably jointed at a forward end to a rear portion of said free floating reel assembly and are yieldably attached at a rear end to the frame of the elevating conveyor.

7. The apparatus of claim 6 further wherein said free floating reel assembly is movable generally vertically to accommodate varying sizes of containers of trash, said reel being slidable on said stabilizer arms in response to the size of the trash, said first and second pairs of cantilever arm assemblies providing support for said reel assembly providing limiting means for the generally vertical movement of said reel assembly.

8. The apparatus of claim 1 wherein said free floating reel assembly includes a flexible, moving belt, said belt carrying spaced rows of outwardly extending flexible flaps, said belt and flaps coacting with cleats on said underroller assembly to pick up the trash and carry it to the forward end of the inclined elevating conveyor.

9. The apparatus of claim 8 wherein said cleats on said underroller assembly extend and retract through slots in an outer rotating hollow cylinder portion of said underroller assembly.

10. The apparatus of claim 9 wherein said cleats are secured to a central hub, said hub being rotatable about a central offset stationary crankshaft disposed within said outer rotating hollow cylinder whereby rotation of said cylinder will rotate said cleats and hub about said crankshaft to effect the extension and retraction of said cleats.

11. The apparatus of claim 8 wherein a scraper blade is positioned adjacent and to the rear of said underroller to dislodge any trash adhering to said underroller assembly.

12. The apparatus of claim 11 wherein said scraper blade is secured to a support bar said support bar being adjustable secured to forward end plates of the frame of the inclined elevating conveyor.

13. In an automatic trash pickup apparatus including means for picking up articles of trash from a surface and plcing the trash on an inclined elevating conveyor for deposition in a storage portion of a vehicle on which the pickup apparatus is mounted, the improvement comprising:
a front elevating and turning bolster assembly for attaching a forward end of the elevating conveyor to the vehicle, said bolster assembly including means for compensating for compression of the vehicle's suspension as said pickup apparatus is swung laterally.

14. The apparatus of claim 13 wherein said front elevating and turning bolster assembly includes a box-like mounting sleeve attached to a front portion of the vehicle.

15. The apparatus of claim 14 further including a sliding bar disposed within said box-like mounting sleeve, said sliding bar being supported by spaced rollers in said mounting sleeve.

16. The apparatus of claim 15 wherein a base support bar is pivotably secured above said sliding bar exteriorly of said mounting sleeve.

17. The apparatus of claim 16 wherein a support channel which supports the inclined elevating conveyor is connected to said base support bar by pairs of elevating cylinders and telescoping stabilizer tubes, said elevating cylinders and telescoping stabilizing tubes being connected to said base support bar and said support channel by universal joints.

18. The apparatus of claim 17 wherein said sliding bar is movable out of and retractable int said box-like mounting sleeve by a turning cylinder, movement of said sliding bar effecting lateral movement of said trash pickup apparatus whereby said apparatus may be moved to the side of the vehicle.

19. The apparatus of claim 18 wherein said sliding bar is disposed in said box-like channel at an angle to the horizontal whereby movement of said sliding bar outwardly of said box-like mounting sleeve will raise the pickup apparatus to counteract compression of the vehicle's suspension so that the pickup apparatus will remain level.

20. The apparatus of claim 13 wherein said bolster assembly has elevating cylinders and includes means to automatically raise and lower the forward end of the inclined elevating conveyor in response to changes in the height of the surface from which the trash is picked up.

21. The apparatus of claim 20 further wherein the forward end of the inclined elevating conveyor carries gauge wheels, said gauge wheels sensing changes in elevation of the surface on which the trash is disposed and actuating said elevating cylinders to raise or lower the forward end of the inclined elevating conveyor whereby the forward portion of the trash pickup apparatus is maintained in close proximity to the surface during operation.

22. The apparatus of claim 13 wherein the elevating conveyor is further mounted on the vehicle by a ball and socket assembly.

23. The apparatus of claim 22 wherein said ball and socket assembly is secured at a first end to the frame of the vehicle and at a second end to the inclined elevating conveyor generally at the rear of the elevating conveyor.

24. An automatic trash pickup assembly movably mounted on a vehicle for pickup up trash from a surface and depositing the trash in a storage area of the vehicle, said trash pickup assembly comprising;
an inclined retractable and extendable elevating conveyor, said elevating conveyor extending generally forwardly of the vehicle and carrying trash to the storage area;
a free floating reel assembly carried at a forward end of said elevating conveyor, said reel assembly including a flexible belt provided with transverse rows of flaps;
a counterrotating underroller secured to said forward end of said elevating conveyor, said underroller having extending and retracting cleats which coact with said flaps and belt of said reel assembly to pick up and place trash on said forward end of said elevating conveyor;
a front elevator and turning bolster assembly secured to a front portion of the vehicle for supporting generally said forward end of said elevating conveyor; and
a ball and socket assembly, a first end of said ball and socket assembly being secured to the vehicle and a second end of said ball and socket assembly supporting a rear portion of said elevating conveyor.

25. The apparatus of claim 24 further wherein said free floating reel assembly is slidably attached to upwardly extending stabilizer arms, said arms being pivotably secured at a first end to said forward end of said elevating conveyor.

26. The apparatus of claim 25 further wherein first and second cantilever arm assemblies are pivotably attached to a frame portion of said elevating conveyor and to said free floating reel assembly, said cantilever arm assemblies defining the path of generally vertical travel of said reel assembly on said stabilizer arms.

27. The apparatus of claim 24 further wherein a pair of outwardly extending guide wings are secured to said forward end of said elevating conveyor.

28. The apparatus of claim 24 wherein said front elevator and turning bolster assembly includes a box-like mounting sleeve secured to the front of the vehicle, said mounting sleeve supporting a sliding bar therewithin, said sliding bar being extendable and retractable out of and into said mounting sleeve by a turning cylinder.

29. The apparatus of claim 28 wherein a base support bar is pivotably supported by said sliding bar above said mounting sleeve, said base support bar being joined by spaced pairs of elevating cylinders and telescoping stabilizer tubes to a support channel, said elevating conveyor being carried by said support channel, said elevating cylinders and telescoping stabilizer tubes being joined to said base support bar and said support channel through universal joints.

30. The apparatus of claim 28 wherein said sliding bar is supported by rollers in said box-like mounting sleeve, said sliding bar being inclined from the horizontal to elevate said trash pickup assembly's forward end as said assembly is swung laterally of the vehicle, the elevation of said pickup assembly compensating for compression of the vehicle's suspension as said pickup assembly is swung laterally.

* * * * *

UNITED STATES PATENT AND TRADEMARK OFFICE
CERTIFICATE OF CORRECTION

PATENT NO. : 4,051,961
DATED : October 4, 1977
INVENTOR(S) : James P. Williams

It is certified that error appears in the above-identified patent and that said Letters Patent are hereby corrected as shown below:

<u>IN THE CLAIMS</u>

Claim 12, line 3, "adjustable" should be --adjustably--.

Claim 13, line 3, "plcing" should be --placing--.

Claim 18, line 2, "int" should be --into--.

Signed and Sealed this

Third Day of January 1978

[SEAL]

Attest:

RUTH C. MASON
*Attesting Officer*

LUTRELLE F. PARKER
*Acting Commissioner of Patents and Trademarks*